United States Patent
Kolehmainen et al.

(10) Patent No.: US 11,336,334 B2
(45) Date of Patent: May 17, 2022

(54) ELECTRONIC LABEL APPARATUS, INDUCTIVE BASE STATION, ELECTRONIC LABEL SYSTEM AND METHOD OF LOCATING ELECTRONIC LABEL APPARATUS

(71) Applicants: Ville Kolehmainen, Vuokatti (FI); TEKNOLOGIAN TUTKIMUSKESKUS VTT OY, Espoo (FI)

(72) Inventors: Ville Kolehmainen, Vuokatti (FI); Jukka Kämäräinen, Kajaani (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 74 days.

(21) Appl. No.: 17/046,137

(22) PCT Filed: Apr. 4, 2019

(86) PCT No.: PCT/FI2019/050270
§ 371 (c)(1),
(2) Date: Oct. 8, 2020

(87) PCT Pub. No.: WO2019/197716
PCT Pub. Date: Oct. 17, 2019

(65) Prior Publication Data
US 2021/0036739 A1 Feb. 4, 2021

(30) Foreign Application Priority Data

Apr. 11, 2018 (FI) ...................... 20185349

(51) Int. Cl.
*H04B 5/00* (2006.01)
*G01S 13/75* (2006.01)

(52) U.S. Cl.
CPC ............ *H04B 5/0062* (2013.01); *G01S 13/75* (2013.01); *H04B 5/0043* (2013.01); *H04B 5/0087* (2013.01)

(58) Field of Classification Search
CPC .. H04B 5/0062; H04B 5/0043; H04B 5/0087; H04B 5/0056; H04B 5/0081;
(Continued)

(56) References Cited

U.S. PATENT DOCUMENTS 6,011,487 A 1/2000 Plocher
6,414,635 B1 7/2002 Stewart et al.
(Continued)

FOREIGN PATENT DOCUMENTS

CA 2175032 4/1997

OTHER PUBLICATIONS

Search Report for FI Application No. 20185349 dated Nov. 8, 2018, 2 pages.
(Continued)

*Primary Examiner* — Shaima Q Aminzay
(74) *Attorney, Agent, or Firm* — Nixon & Vanderhye PC

(57) ABSTRACT

An electronic label apparatus comprises: an inductive communication unit which communicates wirelessly using inductive signals; a processor; memory including a computer program code; and a power source which supplies electric power to the inductive communication unit, the processor, and the memory for enabling their operation. The processor, the memory, the computer program code and the power source with the electric power cause the electronic label apparatus at least to: receive a plurality of inductive signals of known transmission powers from known locations; measure signal powers of the received inductive signals; and determine information about a location of the electronic label apparatus based on the measured signal
(Continued)

powers, the known transmission signal powers and the known locations.

20 Claims, 6 Drawing Sheets

(58) Field of Classification Search
CPC .......... G01S 13/75; G01S 1/00; G01S 5/0027; G01S 5/0036; G01S 5/0081; G01S 5/00; G06K 19/0707; G06K 17/0029; G06Q 30/06; H04W 72/1289; H04W 84/042; H04W 48/02
USPC ...................................................... 455/41.1
See application file for complete search history.

(56) References Cited

U.S. PATENT DOCUMENTS

| | | | |
|---|---|---|---|
| 7,152,040 B1 | 12/2006 | Hawthorne et al. | |
| 7,768,392 B1 * | 8/2010 | Brand | G01D 21/00 340/539.13 |
| 2004/0099735 A1 | 5/2004 | Neumark | |
| 2004/0162626 A1 | 8/2004 | Farchmin et al. | |
| 2006/0092072 A1 | 5/2006 | Steiner | |
| 2014/0070919 A1 | 3/2014 | Jackson et al. | |
| 2015/0318624 A1 | 11/2015 | Schantz et al. | |

OTHER PUBLICATIONS

International Search Report for PCT/FI2019/050270 dated Sep. 3, 2019, 6 pages.

Written Opinion of the ISA for PCT/FI2019/050270 dated Sep. 3, 2019, 12 pages.

Extended European Search Report dated Dec. 23, 2021 in corresponding European Application No. 19784417.8, 16 pages.

* cited by examiner

ELECTRONIC LABEL APPARATUS, INDUCTIVE BASE STATION, ELECTRONIC LABEL SYSTEM AND METHOD OF LOCATING ELECTRONIC LABEL APPARATUS

This application is the U.S. national phase of International Application No. PCT/FI2019/050270 filed Apr. 4, 2019 which designated the U.S. and claims priority to FI Patent Application No. 20185349 filed Apr. 11, 2018, the entire contents of each of which are hereby incorporated by reference.

FIELD

The invention relates to an electronic label apparatus, an inductive base station, an electronic label system and a method of locating the electronic label apparatus.

BACKGROUND

Product information systems such as electronic shelf tag systems may be wired or wireless. In the wired tag systems, no electric power storages are required in each separate operational units for their operation but, on the other hand, the wiring itself is a problem by consuming material resources and space, for example. The wires are also complicate and tedious to install (and remove).

In the wireless tag systems, the power consumption is a problem because the power sources have limited amounts of energy and thus the power consumption of the tag system is an important issue. The wireless transmissions of the operational units may also interfere each other.

In general, a price per product information label of the present electronic tag systems is rather high because of the used technology. Product information (such as prices) of the product information labels is constantly changing which is challenging for communication. Locations of the product information labels should also be effectively determined. Hence, there is need to improve the product information systems.

BRIEF DESCRIPTION

The present invention seeks to provide an improvement to the product information systems. The invention is defined by the independent claims. Examples of the invention are defined in the dependent claims.

LIST OF DRAWINGS

Example embodiments of the present invention are described below, by way of example only, with reference to the accompanying drawings, in which FIG. 1 illustrates an example of an electronic label apparatus;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling are irrelevant to the actual invention. Therefore, they need not be discussed in more detail here.

Figure 1:
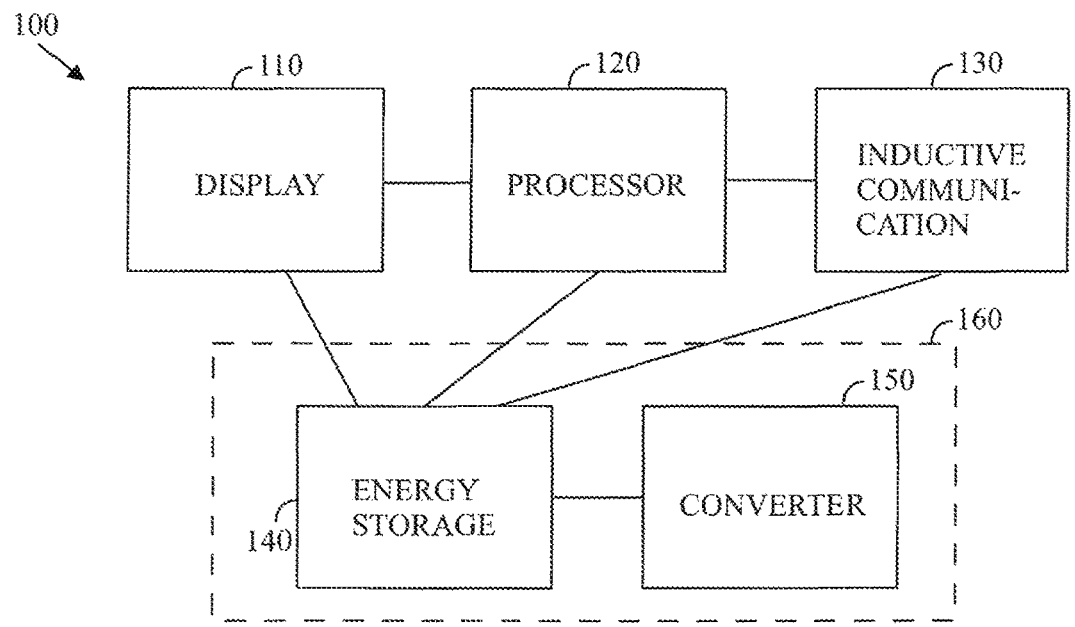
Figure 2:
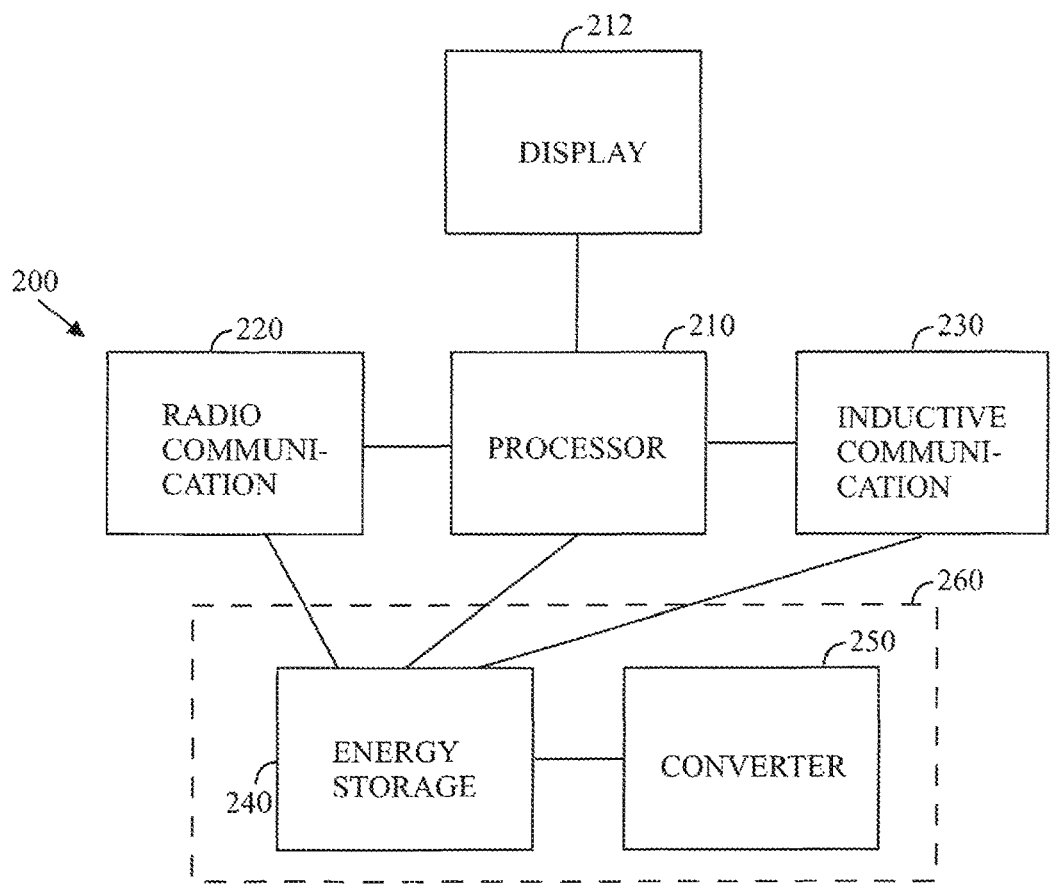
FIG. 2 illustrates an example of an inductive base station.
Figure 5:
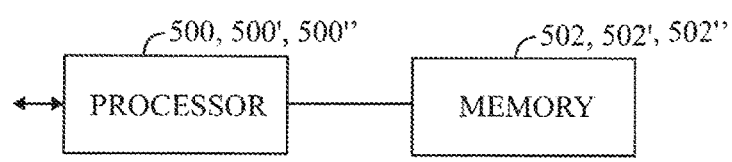
FIG. 5 illustrates an example of a signal processing unit.

FIG. 1 illustrates an example of an electronic label apparatus 100 that comprises a first inductive communication unit 130, a first signal processing unit 120, and a first power source 160. The first signal processing unit 120 comprises one or more first processors 500 and one or more first memories 502 (see FIG. 5). The names of the parts 120, 130, 500, 502 and 160 of FIGS. 1 and 5 have the term "first" because, as shown in FIGS. 2 and 5, inductive base stations 200 may have also similar parts, and it is a purpose the make them be distinguishable. That is also why the similar parts 210, 230, 500', 502' and 260 of FIGS. 2 and 5 have the term "second". The first inductive communication unit 130 communicates wirelessly using inductive signals. The one or more first memories 502 includes a first computer program code. The one or more first memories 502 may include a unique identification data of the electronic label apparatus 100. The first power source 160 supplies electric power to the first inductive communication unit 130, the one or more first processors 500, and the one or more first memories 502 for enabling their operation.

Communication using inductive signaling may be understood on the basis of the following. When alternating electric current is fed to a coil, it forms a correspondingly alternating magnetic field around the coil. When an alternating magnetic field interacts with a coil having a suitable orientation with respect to the alternating magnetic field, it induces a corresponding electric current in the coil. The inductive communication may utilize a suitable modulation for the data transmission. The modulation may be amplitude-shift-keying (ASK), phase-shift-keying (PSK), binary-PSK (BPSK), differential-PSK (DPSK), quadrature-PSK (QPSK), differential-quadrature-PSK (DQPSK), offset-quadature-PSK (OQPSK), quasi-coherent-PSK (QCPSK), on/off-coding (OOK) or the like, for example. In reception, the received signal may be amplified.

The one or more first processors 500, the one or more first memories 502 (see FIG. 5), the first computer program code and the first power source 160 with the electric power cause the electronic label apparatus 100 at least to receive at least one inductive signal of a known transmission power from a known location, measure signal power components of the at least one received inductive signal the signal power components being orthogonal with respect to each other, and determine information about a location of the electronic label apparatus 100 based on the measured signal power components, the known transmission signal power(s) and the known location(s).

The determination of the location may be based on received signal strength indication (RSSI) which is known, per se, by a person skilled in the art. The location may further be determined on the basis of several determined distances using a square-root method which, in turn, may be solved using Newtonian iteration, for example. Instead of the Newtonian iteration, Quasi-Newton, Newton-Rapshon and/or Gauss-Seidel method(s) may be used. These methods are also, per se, known by a person skilled in the art.

The inductive signals come from the ambient inductive base stations 200 (see FIG. 2) which transmit in the surroundings of the electronic label apparatus 100. A location of the inductive label apparatus 100 may be based on power of at least one received inductive signal and an angle-of-arrival (AOA).

In an embodiment, the inductive label apparatus 100 may determine its location on the basis of at least one inductive signal it receives from another inductive label apparatus 100. In an embodiment, the inductive label apparatus 100 may determine its location on the basis of at least one inductive signal it receives from another inductive label apparatus 100 and at least one inductive signal from at least one inductive base station 200. The inductive label apparatus 100 may transmit its location after determination. Other inductive label apparatuses 100 may utilize the location information in their location determination.

Figure 3:
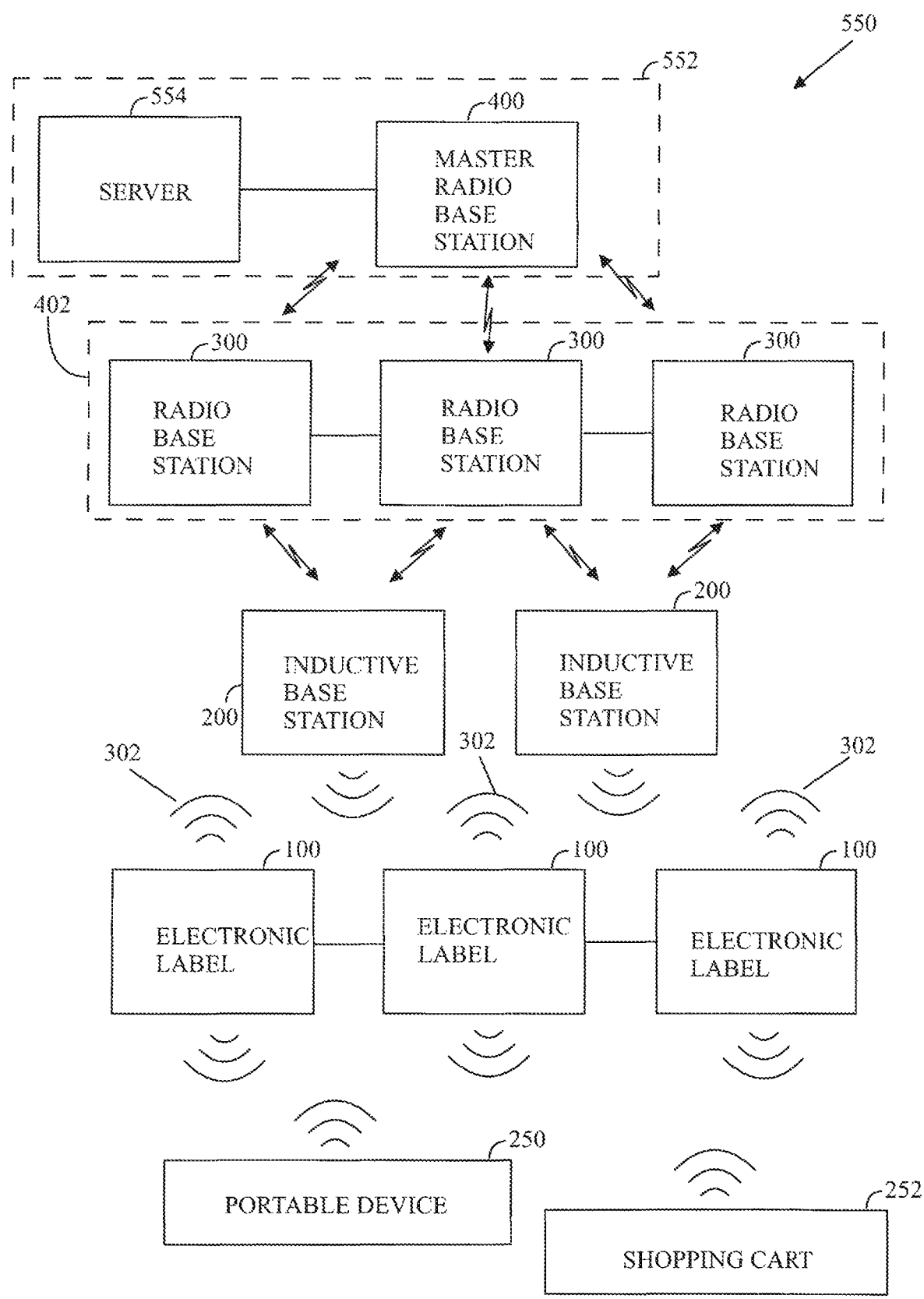
FIG. 3 illustrates an example of an electronic label system.
Figure 4A:
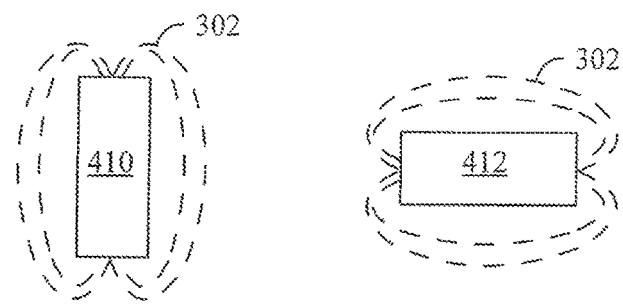
FIG. 4A illustrates an example of orthogonal magnetic fields.

In an embodiment an example of which is illustrated in FIG. 4A, the first inductive communication unit 130 may comprise at least two coils 410, 412, which may provide and receive orthogonal magnetic field components 302 (see also FIG. 3) with respect to each other.

Figure 4B:
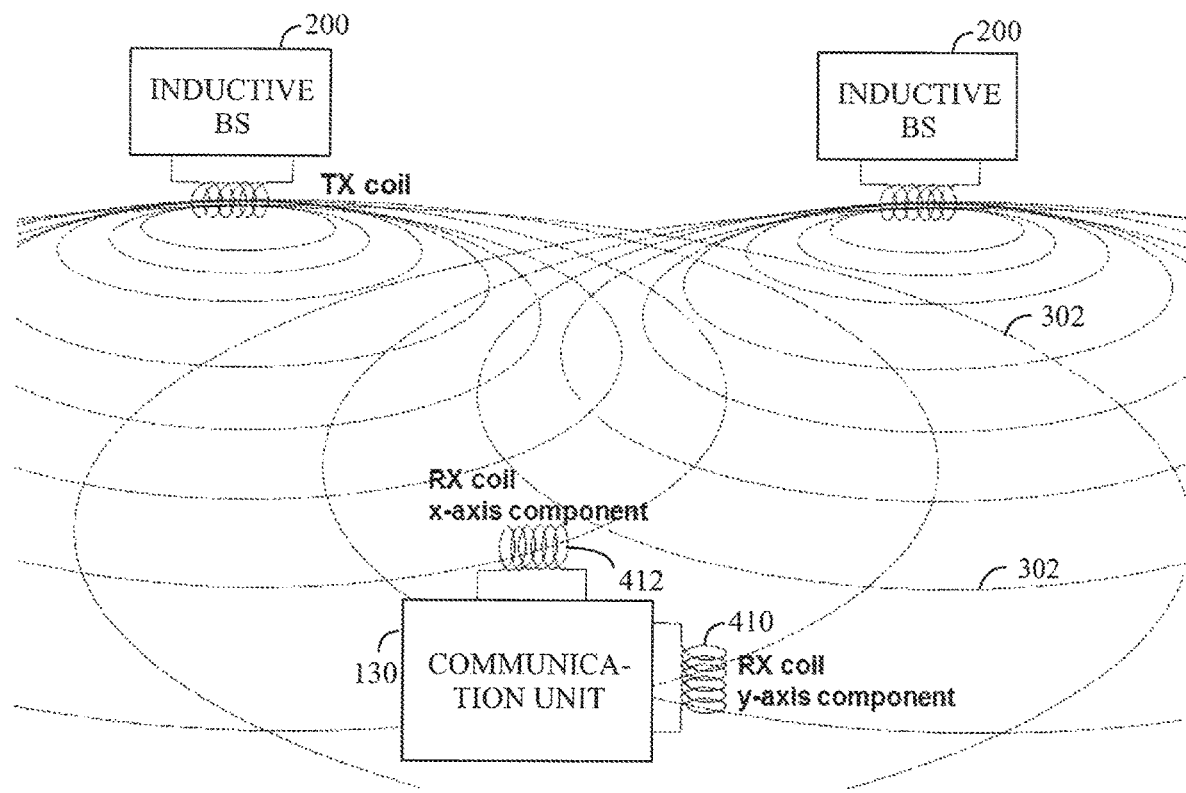
FIG. 4B illustrates an example of detection of magnetic fields in an orthogonal manner.

FIG. 4B illustrates an example where the magnetic field components 302 of magnetic fields of two inductive base stations 200 may detected in orthogonal directions with respect to each other using the orthogonal coils 410, 412 of the inductive communication unit 130 in order to determine the location at least two-dimensionally.

In an embodiment, the first inductive communication unit 130 may comprise three orthogonal coils 410, 412 which interact with corresponding three orthogonal components 302 of magnetic field transmitted by the inductive base stations 200 in order to determine the location three-dimensionally (three coils are not shown in Figures but a person skilled in the art understands the configuration on the basis of Figured 4A and 4B). The location may be determined on the basis of a triangulation technique which is, per se, known to a person skilled in the art. In some cases, inductive transmissions from four different directions may be required for determining the location.

In an embodiment (see FIGS. 4A, 4B), the coils 410, 412 may have coil axes in orthogonal directions with respect to each other in order to receive inductive signals transmitted with corresponding orthogonal components 302 of magnetic field.

Figure 4C:
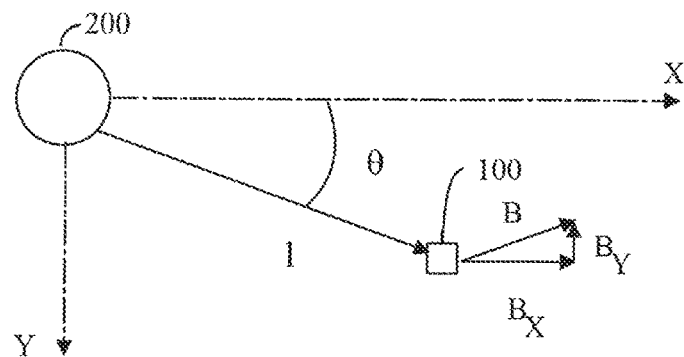
FIG. 4C illustrates an example of location determination on the basis of magnetic field components.

FIG. 4C illustrates an example of measuring a location on the basis of magnetic fields. In this example, the axis of a coil of an inductive base station 200 is parallel to the x-axis. The axes of coils of an inductive label apparatus 100 are parallel to x-axis and y-axis and they measure the field of the coil of the inductive base station 200. The magnetic field B of the coil of the inductive base station 200 is divided in magnetic components Bx and By when received by the orthogonal coils of the inductive label apparatus 100 at distance 1 in the direction θ. The current that is induced in the different coils of the inductive label apparatus 100 may be converted into voltage and its effective value (root mean square value, for example) is directly proportional to the strength of the magnetic field. In this manner, each receiving coil responds independently to a single corresponding orthogonal component of the magnetic field.

Figure 4D:
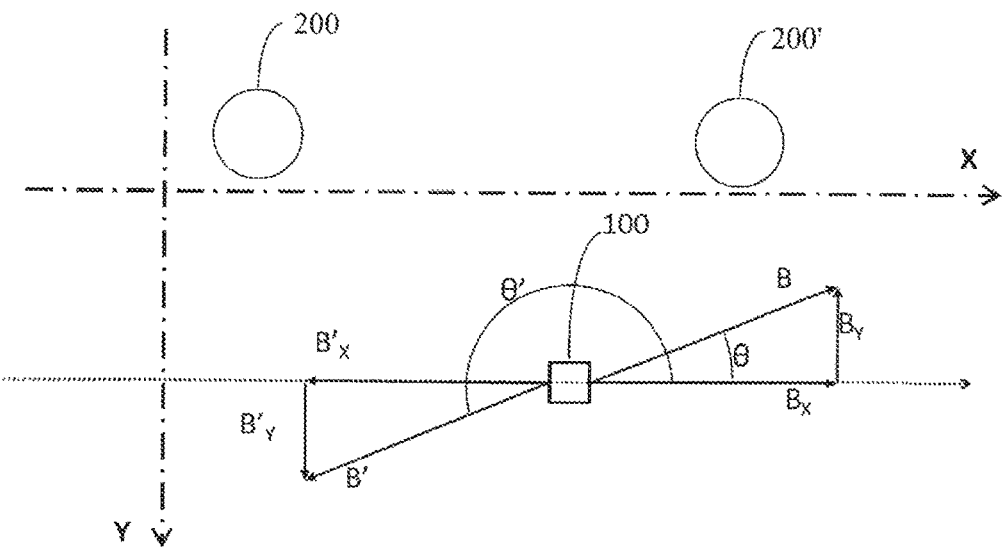
FIG. 4D illustrates an example of a measurement of a location on the basis of magnetic fields.

FIG. 4D illustrates an example of an embodiment of a measurement of a location on the basis of magnetic fields. In this example, the axis of a transmission coil of the inductive base station 200 is parallel to the x-axis, and the axis of a transmission coil of the inductive base station 200' is also parallel to the x-axis. The number of the base stations 200, 200' may also be more than two. The axes of receiver coils of the inductive label apparatus 100 are parallel to x-axis and y-axis and they measure the field of the coil of the inductive base station 200 and also measure the field of the coil of the inductive base station 200'. The use of the Cartesian x- and y-axes is an example of a more general concept that the signal power components are orthogonal with respect to each other.

The magnetic field B of the transmission coil of the inductive base station 200 is divided in magnetic components Bx and By when received by the orthogonal coils of the inductive label apparatus 100. The current that is induced in the different coils of the inductive label apparatus 100 may be converted into voltage and its effective value (root mean square value, for example), and a total strength of magnetic field B and directions of magnetic field θ may be calculated. The magnetic field B' and a direction θ' of the transmission of the coil of the inductive base station 200' may be calculated accordingly.

The location may be determined on the basis of several determined magnetic field strengths and directions using a least squares method and Newtonian iteration, for example. A person skilled in the art is familiar with the method and iteration, per se.

In an embodiment, the first power source 160 may comprise a non-chargeable battery as a first electric energy storage 140.

In an embodiment, the first power source 160 may comprise a first ambient energy converter 150 which may convert ambient energy into an electric form. A first electric energy storage 140 of the first power source 160 may store the electric energy from the first ambient energy converter 150. In an embodiment, the first electric energy storage 140 may comprise a repeatedly chargeable battery which the first energy converter 150 may continuously or discontinuously recharge.

In an embodiment, the first ambient energy converter 150 may comprise a harvester which may collect the ambient energy and convert it into the electric energy. The ambient energy that is converted may include energy of electromagnetic signals, kinetic energy, solar power, thermal energy or their combination, for example. The person skilled in the art is familiar with the conversion and energy harvesting, per se.

In an embodiment, the electronic label apparatus 100 may transmit information about its determined location using the inductive communication of the first inductive communication unit 130. In an embodiment, the electronic label apparatus 100 may transmit the unique identification data with determined location using the inductive communication of the first inductive communication unit 130.

In an embodiment, the electronic label apparatus 100 may comprise a first display 110. In an embodiment, the electronic label apparatus 100 may present product information of a product adjacent to the electronic label apparatus 100 on the first display 110. In an embodiment, the product information may include price of the product.

FIG. 2 illustrates on example of the inductive base station 200. The inductive base station is installed in a location which is known or predetermined. The inductive base station 200 comprises a second inductive communication unit 230, a second signal processing unit 210 (see FIG. 5), and a second power source 260. The signal processing unit 210 comprises one or more first processors 500' and one or more first memories 502' (see FIG. 5). FIG. 5 is used to illustrate the one or more processors and the one or more memories in general.

The second inductive communication unit 230 communicates wirelessly using inductive signals. The inductive base station 200 may comprise one or more coils similar to the coils 410, 412 of the inductive label apparatus 100. The one or more second memories 502' include a second suitable computer program code and a unique identification data of the inductive base station 200. The second power source 260 supplies electric power to the second inductive communication unit 230, the one or more second processors 500', and the one or more second memories 502' for enabling their operation.

The second inductive communication unit 230 may perform at least one of the following: transmit an inductive signal of known transmission power, and receive the first inductive signal. The received inductive signal may be considered a first inductive signal and the transmitted inductive signal may be considered a second inductive signal.

The one or more second processors 500', the one or more second memories 502', the second computer program code and the second power source 260 with the electric power cause the inductive base station 200 at least to transmit an inductive signal for the at least one electronic label apparatus 100, receive at least one inductive signal from at least one electronic label apparatus 100, measure signal power components of the at least one received inductive signal, and determine information about a location of the at least one electronic label apparatus 100 on the basis of the signal power components, a known transmission power and the known location of the inductive base station 200. The signal power components are orthogonal with respect to each other. Each of the electronic label apparatus 100 transmits using a known transmission power. The inductive base station 200 may be in the line-of-sight with the electronic label apparatus 100 with which it has communication. However, the line of sight is not a requirement for the inductive communication. The distance between the inductive base station 200 and the electronic label apparatus 100 may be reliably determined in either the inductive base station 200 or the electronic label apparatus 100. The one or more reliably determined distances make it also possible to determine information about a location of the electronic label apparatus 100 in a reliable manner.

The inductive signal transmitted by the inductive base station 200 may include product specific information that is required to be stored in the at least one electronic label apparatus 100 in coverage of the transmission, and possibly presented by the electronic label apparatus 100. The coverage of inductive transmission may be a few meters, for example. The coverage of inductive transmission may be less than 2 meters, for example.

The transmitted inductive signal that is transmitted from the inductive base station 200 has known transmission power and the inductive base station 200 has said known location. The transmitted signal includes the unique data of the inductive base station 200.

Each signal from the electronic label apparatuses 100 may carry the unique identification data of the electronic label apparatus 100 that transmitted it.

Each signal is transmitted by the inductive base station 200 using a known transmission power. The known transmission power may be predefined common to all inductive base stations 200 and stored in the electronic label apparatuses 100. The known transmission power may be predefined for each inductive base station 200 separately and stored in at least the electronic label apparatuses 100 which can receive the transmissions. Information of the transmission power may be included in the transmitted signal in order to make the transmission power known in the receiver. In these cases, the electronic label apparatuses 100 and/or the inductive base stations 200 may be calibrated before use such that they may use a predetermined table or a predetermined function based on the calibration in order to compute a distance or distances for forming information about the location.

Each signal is transmitted by the electronic inductive label apparatus 100 using a known transmission power. The known transmission power may be predefined common to all electronic label apparatuses 100 and stored in the inductive base stations. The known transmission power may be predefined for each electronic label apparatus 100 separately and stored in at least the inductive base stations 200, which can receive the transmissions. Information of the transmission power may be included in the transmitted signal in order to make the transmission power known in the receiver.

The inductive base station 200 may determine information about a location of the at least one electronic label apparatus 100 based on the at least one measured signal power components of a received signal, the known transmission power of the measured signal, the unique identification data of the electronic label apparatus 100, and the known location of the inductive base station 200. The location information may include a distance between the electronic label apparatus 100 that is identified on the basis of the identifying data and the inductive base station 200. The location information may include a distance and a direction between the electronic label apparatus 100 that is identified on the basis of the identifying data and the inductive base station 200. The location information may include coordinates of the electronic label apparatus 100 that is identified on the basis of the identifying data with respect to the coordinates of the inductive base station 200.

In an embodiment, the second power source 260 may comprise a second ambient energy converter 250 (see example of FIG. 2) that may convert ambient energy into an electric form. A second electric energy storage 240 of the second power source 260 may store the electric energy from the second ambient energy converter 250.

In an embodiment, the second electric energy storage 240 may comprise a repeatedly chargeable battery which the second energy converter 250 may continuously or discontinuously recharge.

In an embodiment, the second ambient energy converter 250 may comprise a harvester which may collect the ambient energy and convert it into the electric energy. The ambient energy that is converted may be energy of electromagnetic signals, kinetic energy, solar power, thermal energy or any combination thereof, for example. The person skilled in the art is familiar with the conversion and energy harvesting, per se.

In an embodiment, the inductive base station 200 may comprise a radio communication unit 220 which may receive electric power from the second power source 260 and communicate wirelessly using electromagnetic radio frequency signals with an ambient radio base station system 402. The inductive base station 200 may transmit information it has received from at least one electronic label apparatus 100 to the radio base station system 402. The radio base station system 402 may transmit information to the inductive base station 200, and the inductive base station 200 may forward it to at least one electronic label apparatus 100 using the inductive communication.

The electronic label system 550, an example of which is illustrated in FIG. 3, comprises a plurality of the electronic label apparatuses 100, a plurality of the inductive base stations 200 at known locations, and a radio base station system 402.

In an embodiment, the wireless communication using electromagnetic radio frequency signals may comprise at least one of the following: ultra-wide-band (UWB), bluetooth, bluetooth low energy (BLE), wireless local area network (WLAN), and 2.4 GHz radio communication, near field communication (NFC), sub-1 GHz radio frequency communication, or other else radio communication system, for example. The radio communication may be performed between the inductive base stations 200 and the radio base stations 300 or the inductive base stations 200 and the master radio base station 400.

In an embodiment, the inductive base stations 200 may be located on the basis of radio communication between the inductive base stations 200 and the radio base stations 300 and/or the inductive base stations 200 and the master radio base station 400. The determination of information about a location may be performed using at least one of the following: time-of-flight (TOF), time-of-arrival (TOA), time-difference-of-arrival (TDOA), two-way-ranging, angle-of-arrival (AOA) and received signal strength indication (RSSI). Additionally or alternatively, some other method for determination of a location of the inductive base stations 200 may be used.

In an embodiment, when a location of an inductive base station 200 has been determined, the inductive base station 200 may transmit information about its location other inductive base stations 200 which are in the coverage using inductive communication or radio communication. The other inductive base stations 200 may utilize this location information in determination of their own location. When an inductive base station 200 has received transmissions including information about locations of two or more inductive base stations 200, the inductive base station 200 may determine its own location even if no signal is available from the radio base stations 300 and the master radio station 400. Correspondingly, any inductive base station 200 may determine its own location even if there is no line-of-sight between the radio base stations 300 and a plurality of the inductive base stations 200, and/or the inductive base station 200 and the master radio station 400. The transmission between the radio base stations 300 and the inductive base stations 200 may be performed on the basis of inductive communication and/or radio communication. The transmission between the master radio station 400 and the inductive base stations 200 may be performed on the basis of inductive communication and/or radio communication. The determination of location of the inductive base station 200 may be based on at least one of the following: time-of-flight (TOF), time-of-arrival (TOA), time-difference-of-arrival (TDOA), two-way-ranging, and angle-of-arrival (AOA) and received signal strength indication (RSSI).

In an embodiment, the one or more processors 500', the one or more memories 502', the computer program code and the power source 260 of an inductive base station 200 with the electric power may cause the inductive base station 200 to receive a plurality of ambient radio signals from known locations. The radio signals may be UWB signals, bluetooth signals, BLE-signals, WLAN signals or the like, for example. Then the inductive base station 200 may determine its location based on the received radio signals. The radio signals may come from the radio base stations 300 and/or the master radio base station 400, for example. In an embodiment, the one or more processors 500', the one or more memories 502', the computer program code and the power source 260 of an inductive base station 200 with the electric power may cause the inductive base station 200 to receive a plurality of ambient optical signals from known locations. Then the inductive base station 200 may determine its location based on the received optical signals. The optical signals may come from the radio base stations 300 and/or the master radio base station 400, for example.

Each of the electronic label apparatuses 100 comprises what is explained above about the electronic label apparatus 100. Each of the inductive base station 200 comprises what is explained above about the inductive base station 200. Each of the inductive base station 200 may communicate, by the radio communication unit 220, using the radio signals with the base station system 402. The radio signals may include information about at least one electronic label apparatus 100 and/or information to at least one electronic label apparatus 100.

In an embodiment, the inductive base station 200 may receive product information of a product adjacent to the inductive base station 200 and present the product information on its display 212.

One or more first and/or second processors 500, 500', one or more first and/or second memories 502, 502', and the first and/or second computer program code of the electronic label system 550 are, in order to determine a location of an electronic label apparatus 100 of the electronic label apparatuses 100, configured perform the following steps. Signal power components of at least one inductive signal of the first inductive signal and the second inductive signal communicated between the electronic label apparatus 100 a location of which is to be determined and at least one of the inductive base stations 200 is determined. A location of the electronic label apparatus 100, a location of which is to be determined, is determined based on the at least one measured power components of a signal that is received, the known transmission power of the at least one measured signal, the unique identification data of the electronic label apparatus 100, a location of which is to be determined, and the at least one known location of the inductive base stations 200 participated in the communication.

In an embodiment, the electronic label system 550 may comprise a server system 552 which is configured to communicate with the electronic label apparatuses 100 such that the communication between the inductive base stations 200 and the server system 552 is based on the radio communication, and the communication between the inductive base stations 200 and the electronic label apparatuses 100 is based on the inductive signals.

In an embodiment, the electronic label system 550 may comprise a server 554 and a master radio base station 400, which may communicate with the radio base stations 300 using radio communication. The master radio base station 400 may communicate with the server 554 over a wired connection of a wireless connection. The connection between the server 554 and the master radio base station 400 may be realized through the Internet, for example. Alternatively or additionally, the connection may be based on WLAN, for example. The server 554 may comprise a cloud server, for example.

In an embodiment, each of the inductive base stations 200 may transmit, using the radio communication unit 220, information about a location of the at least one electronic label apparatus 100 to the radio base station system 402. From the radio base stations 300, the information may be forwarded to the master radio base station 400 and/or the server 554 in the server system 552.

In an embodiment, each of the inductive base stations 200 may directly transmit, using the radio communication unit 220, information about a location of the at least one electronic label apparatus 100 to the master radio base station 400 which may forward the information to the server 554 in the server system 552.

In an embodiment, the one or more processors 500, 500', the one or more memories 502, 502' (see example of FIG. 5), and a suitable computer program code of the electronic label system 550 may route the communication between the electronic label apparatuses 100 and the base station system 402 through one of more of the radio base stations 300 and one or more of the inductive base stations 200 on the basis of the locations of the inductive base stations 200 and the inductive label apparatuses 100. That is, the one or more processors 500, 500' and the one or more memories 502, 502' of the electronic label apparatuses 100 and/or the inductive base stations 200 may perform the routing. In this manner, a signal between the electronic label apparatuses 100 and the base station system 402 does not need to go through all the radio base stations 300 and all the inductive base stations 200, but instead it is possible to select suitable radio base stations 300 and inductive base stations 200 for the connection on the basis of the location(s) of the electronic label apparatus(es) 100 in the desired location(s).

In an embodiment, the inductive base stations 200 may communicate with the master radio base station 400 directly without using the radio base stations 300 of the base station system 402. In an embodiment, each of the inductive label apparatuses 100 may select one or more inductive base stations 200 which is in the coverage. In an embodiment, each of the inductive label apparatuses 100 may select one or more inductive base stations 200 which have stronger received powers than received power of at least one of the inductive base stations 200 within coverage. In an embodiment, each of the inductive label apparatuses 100 may select one inductive base station 200 which has the strongest received power among the received powers of the inductive base stations 200. In an embodiment, each of the inductive label apparatuses 100 may transmit information about the selected one or more inductive base stations 200 to the selected at least one inductive base station 200 in order to have communication only therewith. In an embodiment, each of the inductive base stations 200 may store the information regarding the at least one inductive label apparatus 100 which to communicate with. In an embodiment, the master base station 400 may have, in a similar manner, a list of one or more inductive label apparatuses 100 which the master base station 400 may communicate with through the radio base station(s) 300 and the inductive base station(s) 200 or more directly through inductive base station(s) 200 without the radio base station(s) 300. In an embodiment, the master base station 400 may have a list of one or more radio base stations 300 which the master base station 400 may communicate with. Alternatively or additionally, the server 554 may include information regarding the selected communication between the master radio base station 400 and the radio base stations 300, the master radio base station 400 and the inductive base stations 200, and/or the inductive base stations 200 and the inductive base stations 200. The server 554 may also have a list of locations of each of the inductive label apparatuses 100.

In an embodiment, the one or more processors 500, 500', 500", the one or more memories 502, 502', 502" (see FIG. 5), and the computer program code of the electronic label system 550 may route the communication between the electronic label apparatuses 100 and the base station system 402 through at least one inductive base station 200. That is, the one or more processors 500, 500', 500" and the one or more memories 502, 502', 502" of the electronic label apparatuses 100, the inductive base stations 200 and or other part of the electronic label system 550, for example of the master radio station 400 and/or in the server 554, may perform the routing. Namely, the master radio station 400 and/or the server 554 may have one or more processors, one or more memories and a suitable computer program for carrying out the required actions.

In an embodiment, the electronic label apparatuses 100 may receive signals from and transmit signals to each other using the inductive communication. That kind of communication may be useful, if one or more electronic label apparatuses 100 cannot communicate with any of the inductive base stations 200. In that manner, an alternative route for transferring information may be used.

In an embodiment, the inductive base stations 200 may receive signals from and transmit signals to each other using the inductive communication and/or the radio communication. That kind of communication may be useful, if one or more inductive base stations 200 cannot communicate with one or some of the electronic label apparatuses 100, one or some of the radio base stations 300 and/or the master radio base station 400. In that manner, an alternative route for transferring information may be used.

In an embodiment, the electronic label system 550 may comprise one or more portable devices 250 that may communicate product information to at least one of the electronic label apparatuses 100 using inductive transmission that may be received by the one or more coils 410, 412 of the inductive label apparatus 100. The portable device 250 may comprise one or more coils similar to the coils 410, 412 of the inductive label apparatus 100. The electronic label apparatus 100 may comprise a display 110 for presenting the product information. The electronic label apparatus 100 may be adjacent to a product, information of which the display 110 may then show. Alternatively or additionally, at least one portable device 250 may comprise a radio communication unit similar to that of the inductive base station 200 and may communicate with the at least one inductive base station 200 using radio transmission.

Figure 6A:
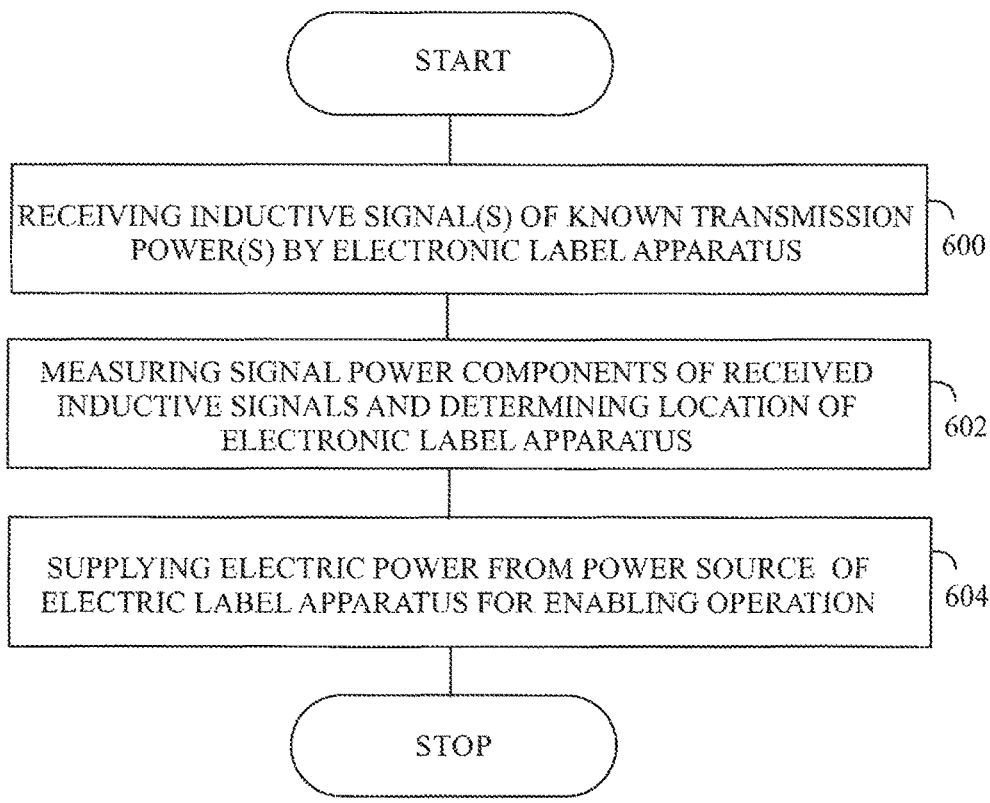
FIG. 6A illustrates an example of a flow chart of a method of locating electronic label apparatus by the electronic label apparatus.

FIG. 6A shows a flow chart of a method of locating an electronic label apparatus 100 by the electronic label apparatus. In step 600, a plurality of inductive signals of known transmission powers are received from known locations. In step 602, signal power components of the at least one inductive signal are measured, and information about a location of the electronic label apparatus is determined on the basis of the measured signal power(s), the known transmission power(s) and known location (s) of transmission. In step 604, electric power from a power source 160 of the electronic label apparatus 100 is supplied for enabling operation of the electronic label apparatus.

Figure 6B:
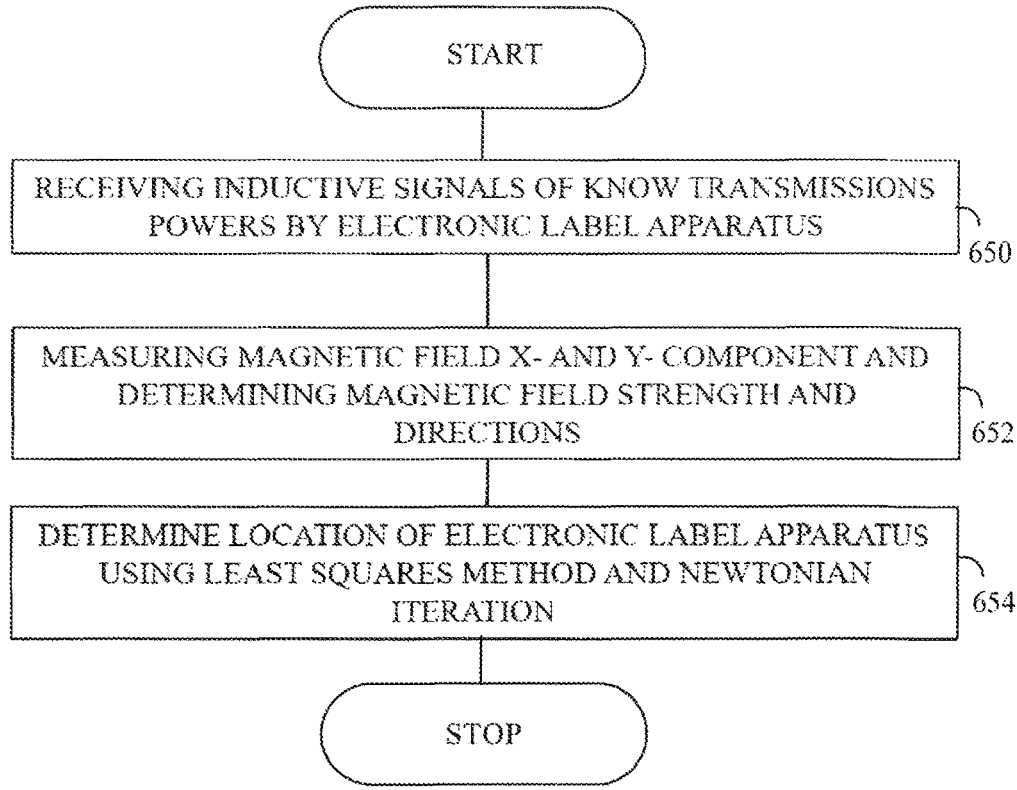
FIG. 6B illustrates an example of a flow chart of a method of locating an electronic label apparatus on the basis of a least squares method and a Newtonian iteration.

FIG. 6B illustrates a flow chart of a method a location of the electronic apparatus 100 using a least squares method and a Newtonian iteration. In step 650, inductive signals of know transmissions powers are received by the electronic label apparatus. In step 652, x- and y-components of a magnetic field are measured, and magnetic field strength and directions are determined. In step 654, a location of the electronic label apparatus is determined using a least squares method and a Newtonian iteration.

Figure 7:
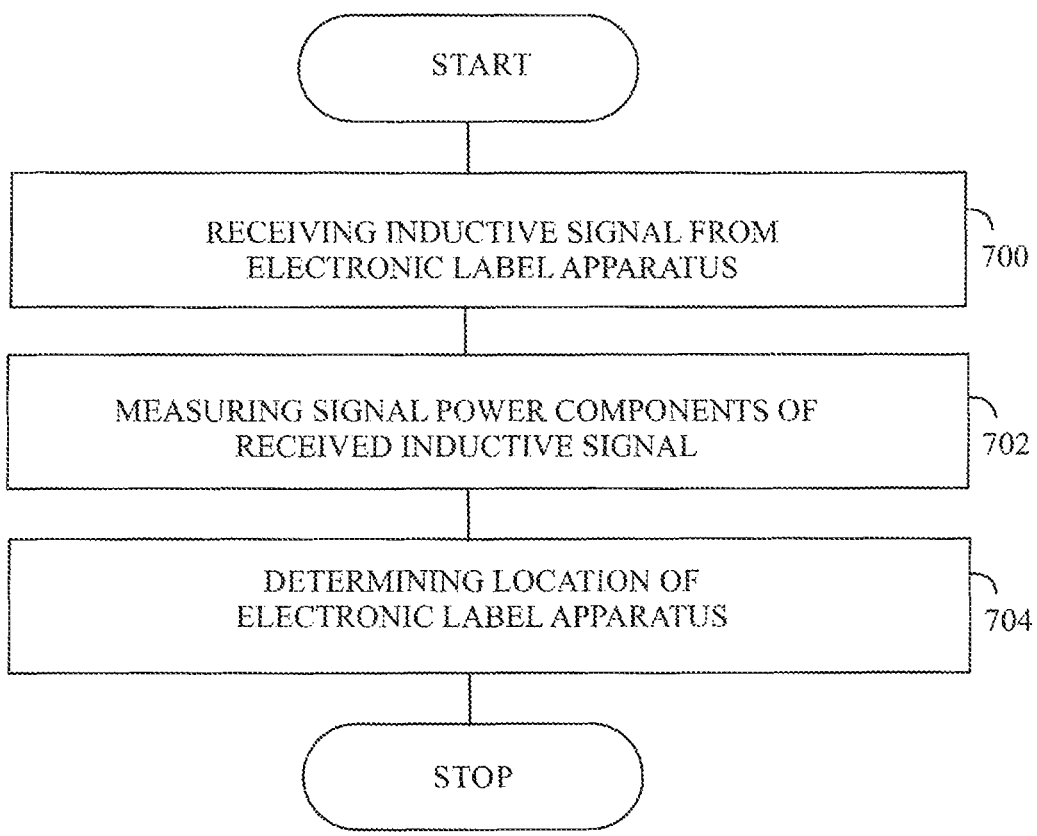
FIG. 7 illustrates of an example of a flow chart of a method of locating electronic label apparatus.

FIG. 7 is a flow chart of a method of locating an electronic label apparatus elsewhere in the electronic label system. In step 700, an inductive signal from an electronic label apparatus 100 is received by an inductive base station 200, a signal of an electronic label apparatus 100 carrying unique identification data of the electronic label apparatus 100, and the inductive signal being transmitted using a known transmission power. In step 702, signal power components of the received inductive signal is measured by an inductive base station 200. In step 704, information about a location of the electronic label apparatus 100 is determined on the basis of the measured signal power, the known transmission power, the unique identification data of the electronic label apparatus 100, and the known location of the inductive base station 200. In an embodiment, the information about the location such as distance or coordinates may be forwarded to the server 554 where the location may be computed, or to the master radio base station 400 where the location may be alternatively or additionally computed.

The methods shown in FIGS. 6 and 7 may be implemented as a logic circuit solution or computer program. The computer program may be placed on a computer program distribution means for the distribution thereof. The computer program distribution means is readable by a data processing device (see FIG. 5), and it encodes the computer program commands, carries out the actions (see FIGS. 6 and 7).

The computer program may be distributed using a distribution medium which may be any medium readable by the data processing device. The medium may be a program storage medium, a memory, a software distribution package, or a compressed software package. In some cases, the distribution may be performed using at least one of the following: a near field communication signal, a short distance signal, and a telecommunications signal.

The distribution medium, in turn, may be a medium readable by the data processing device, a program storage medium, a memory readable by the data processing device, a software distribution package readable by the data processing device, or a compressed software package readable by the data processing device.

The communication using inductive signal enables low electric energy consumption in the electronic label apparatuses 100 and the inductive base stations 200. The inductive signaling causes low interference to other signaling because the inductive signals attenuate strongly as a function of distance. It is assumed that the attenuation depends on a third power of an inverse of the distance, $A \sim 1/(d^3)$, where A is the attenuation and d is the distance between the transmitter and the receiver of the inductive signal. As a comparison, the attenuation of the electromagnetic signals is assumed to depend on a second power of an inverse of the distance. The strong attenuation also enables an accurate location determination on the basis of a signal power measurement. Namely, a small increase in distance results in strong decrease in the signal power and vice versa. The use of several transmitting and receiving coils, the magnetic fields of which are not orientated in parallel, enables an even more effective location determination. In an embodiment, the inaccuracy of the location determination may be a few centimeters. In an embodiment, the inaccuracy of the location determination may be less than 10 centimeters. In an embodiment using several signals, the inaccuracy of the location determination may be less than 1 centimeter. The inductive transceivers make the manufacturing of the electronic label apparatuses 100 and the inductive base stations 200 economical.

The electronic label system based on the inductive communication may be used in retail stores such as grocery stores, supermarkets, convenience stores, pharmacies, electronics stores, hardware stores, or the like, for example. Additionally, the electronic label system based on the inductive communication may also be used in warehouses.

In an embodiment, a shopping cart 252 (see FIG. 3) may have a user interface, a data processing unit, and an inductive communication unit similar to that of the electronic label apparatuses 100 or an inductive communication unit or radio communication unit similar to that of the inductive base station 200 for communicating inductively with the electronic label apparatuses 100. Based on communication between the shopping cart and the electronic label apparatus 100, the shopping cart may cause, on the basis of the data processing unit with a suitable computer program, a change in the output of the user interface for alerting a user of the shopping cart. The user interface may be a source of light, a source of sound, a source of tactile vibration, any combination thereof or the like, for example. The source of light may be a display or at least one lamp. The at least one lamp may comprise a light emitting diode, an incandescent lamp, gas-discharge lamp or the like, for example. The source of sound may comprise an electric sound generator such as a loudspeaker, a piezo electric speaker or the like. The source of tactile vibration may be installed in the handle of the shopping cart. The tactile vibration may refer to haptic communication which can be perceived by the sense of touch.

It will be obvious to a person skilled in the art that, as technology advances, the inventive concept can be implemented in various ways. The invention and its embodiments are not limited to the example embodiments described above but may vary within the scope of the claims.

What is claimed is:

1. An electronic label apparatus, wherein the electronic label apparatus comprises:
    an inductive communication unit which is configured to communicate wirelessly using inductive signals;
    one or more processors;
    one or more memories including a computer program code; and
    a power source which is configured to supply electric power to the inductive communication unit, the one or more processors, and the one or more memories for enabling their operation; and the one or more processors, the one or more memories, the computer program code and the power source with the electric power are configured to cause the electronic label apparatus at least to:

receive at least one inductive signal of a known transmission power, each inductive signal being transmitted from a known location;

measure signal power components of the at least one received inductive signal, the signal power components being orthogonal with respect to each other; and determine information about a location of the electronic label apparatus based on the measured signal powers, the known transmission signal power components and the known locations.

2. The electronic label apparatus of claim 1, wherein the inductive communication unit comprises at least two coils, and components of magnetic field of said at least two coils have orthogonal directions with respect to each other in order to determine the location at least two-dimensionally.

3. The electronic label apparatus of claim 1, wherein the inductive communication unit comprises three orthogonal coils which are configured to interact with corresponding three orthogonal components of magnetic field in order to determine the location three-dimensionally.

4. The electronic label apparatus of claim 1, wherein the power source comprises an ambient energy converter configured to convert ambient energy in an electric form, and an electric energy storage configured to store electric energy from the ambient energy converter.

5. The electronic label apparatus of claim 1, in that, wherein the electronic label apparatus is configured to transmit information about its determined location and unique identification data of said electronic label apparatus inductively.

6. The electronic label apparatus of claim 1, wherein the electronic label apparatus comprises a display, and the electronic label apparatus is configured to present product information of a product adjacent to the electronic label apparatus on the display.

7. An inductive base station for one or more electronic label apparatus, wherein the inductive base station, a location of which is known, comprises:

an inductive communication unit which is configured to communicate wirelessly inductive signals;

one or more processors;

one or more memories including a computer program code and a unique identification data of the inductive base station; and a power source which is configured to supply electric power to the inductive communication unit, the one or more processors, and the one or more memories for enabling their operation;

the one or more processors, the one or more memories, the computer program code and the power source with the electric power are configured to cause the inductive base station at least to:

transmit, by the inductive communication unit, an inductive signal of known transmission power from said known location, the signal including the unique data of the inductive base station;

receive at least one inductive signal from at least one electronic label apparatus, each signal from the electronic label apparatuses carrying unique identification data of the electronic label apparatus that transmitted it and each signal being transmitted using a known transmission power;

measure signal power components of the at least one received inductive signal from the at least one electronic label apparatus, the signal power components being orthogonal with respect to each other; and determine information about a location of the at least one electronic label apparatus based on the signal power components, the known transmission power of the measured signals, the unique identification data of the electronic label apparatus, and the known location of the inductive base station.

8. The inductive base station of claim 7, wherein the power source comprises an ambient energy converter configured to convert ambient energy in an electric form, and an electric energy storage configured to store electric energy from the ambient energy converter.

9. The inductive base station of claim 7, wherein the inductive base station comprises a radio communication unit which is configured to receiver electric power from the power source and communicate wirelessly using electromagnetic radio frequency signals with an ambient radio base station system.

10. The inductive base station of claim 7, wherein the one or more processors, the one or more memories, the computer program code and the power source with the electric power are configured to cause the inductive base station:

receive a plurality of ambient radio and/or optical signals from known locations, and determine its location based on the received radio and/or optical signals.

11. The inductive base station of claim 10, wherein at the inductive base station comprises a display, and the inductive base station is configured to receive product information of a product adjacent to the inductive base station, and present the product information on the display.

12. The inductive base station of claim 7, wherein at least one of the inductive base stations is configured to transmit information about its location; and at least one other inductive base station is configured to determine its location on the basis of said transmitted information.

13. An electronic label system, wherein the electronic label system comprises:

a plurality of electronic label apparatuses, a plurality of inductive base stations at known locations, and a radio base station system, and each of the electronic label apparatuses comprises:

a first inductive communication unit which is configured to communicate wirelessly using inductive signals of known transmission power;

one or more first processors;

one or more first memories including a first computer program code and a unique identification data of the electronic label apparatus; and a first power source which is configured to supply electric power to the first inductive communication unit, the one or more first processors, and the one or more first memories for enabling their operation; and the one or more first processors, the one or more first memories, the first computer program code and the first power source with the electric power are configured to cause each of the electronic label apparatus at least to:

perform at least one of the following: receive at least one inductive signal of a known transmission power, each of the at least one inductive signal being transmitted from a known location of the inductive base station, and transmit a first inductive signal with the unique data using known transmission power; and each of the inductive base station comprises:

a second inductive communication unit which is configured to perform at least one of the following: transmit a second inductive signal of known transmission power, and receive the first inductive signal;

a radio communication unit which is configured to communicate wirelessly using radio signals;

one or more second processors;

one or more second memories including a second computer program code and a unique identification data of the inductive base station; and a second power source which is configured to supply electric power to the second inductive communication unit, the radio communication unit, the one or more second processors, and the one or more second memories for enabling their operation;

the one or more second processors, the one or more second memories, the second computer program code and the second power source with the electric power are configured to cause the second inductive base station at least to:

communicate, by the second inductive communication unit, using at least one of the following: the first inductive signal, and the second inductive signal;

communicate, by the radio communication unit, using the radio signals with the base station system, the radio signals including information about at least one electronic label apparatus and/or information to at least one electronic label apparatus; and one or more processors, one or more memories, and a computer program code of the electronic label system are, in order to determine a location of an electronic label apparatus of the electronic label apparatuses, configured at least to:

measure received signal power components of at least one inductive signal of the first inductive signal and the second inductive signal communicated by the second inductive communication unit, a location of which is to be determined, and at least one of the inductive base stations, the signal power components being orthogonal with respect to each other; and determine information about a location of the electronic label apparatus a location of which is to be determined based on the measured signal power components, the known transmission power of the at least one measured signal, the unique identification data of the electronic label apparatus a location of which is to be determined, and the at least one known location of the inductive base stations participated in the communication.

14. The electronic label system of claim 13, wherein the base station system comprises a server system which is configured to communicate with the electronic label apparatuses such that the communication between the inductive base stations and the server system is based on the radio communication, and the communication between the inductive base stations and the electronic label apparatuses is based on the inductive signals.

15. The electronic label system of claim 14, wherein the electronic label system comprises at least one portable device configured communicate product information to at least one of the electronic label apparatuses that comprise a display configured to present the product information.

16. The electronic label system of claim 14, wherein the one or more processors, the one or more memories, and the computer program code of the electronic label system are configured to route the communication between the electronic label apparatuses and the base station system through one of more of the radio base stations and one or more of the inductive base stations on the basis of the locations of the inductive base stations and the inductive label apparatuses.

17. The electronic label system of claim 16, wherein the one or more processors, the one or more memories, and the computer program code of the electronic label system are configured to route the communication between the electronic label apparatuses and the base station system through at least one inductive base station.

18. The electronic label system of claim 13, wherein each of the inductive base stations is configured to transmit, using the radio communication unit, information about locations of the electronic label apparatuses to the radio base station system.

19. A method of locating an electronic label apparatus by the electronic label apparatus, the method comprising:

receiving at least one inductive signal of known transmission power from a known location;

measuring signal power components of at least one of inductive signals, and determining information about a location of the electronic label apparatus on the basis of the measured signal power components, the known transmission powers and known locations of transmission, the signal power components being orthogonal with respect to each other; and supplying electric power from a first power source of the electronic label apparatus for enabling operation of the electronic label apparatus.

20. A method of locating an electronic label apparatus, the method further comprising:

receiving, by an inductive base station, an inductive signal from an electronic label apparatus, a signal of an electronic label apparatus carrying unique identification data of the electronic label apparatus, and the inductive signal being transmitted using a known transmission power;

measuring, by an inductive base station, signal power components of the received inductive signal, the signal power components being orthogonal with respect to each other; and determining information about a location of the electronic label apparatus on the basis of the measured signal power components, the known transmission power, the unique identification data of the electronic label apparatus, and the known location of the inductive base station.

* * * * *